(12) United States Patent
Li et al.

(10) Patent No.: US 11,001,717 B1
(45) Date of Patent: May 11, 2021

(54) SUPER-WEAR-RESISTANT SELF-CLEANING COATING AND PREPARATION METHOD THEREFOR

(71) Applicant: BANFERT NEW-MATERIALS TECHNOLOGY CO., LTD, Changsha (CN)

(72) Inventors: Xinxiong Li, Changsha (CN); Shizhen Li, Changsha (CN); Hui Li, Changsha (CN)

(*) Notice: Subject to any disclaimer, the term of this patent is extended or adjusted under 35 U.S.C. 154(b) by 0 days.

(21) Appl. No.: 16/919,261

(22) Filed: Jul. 2, 2020

Related U.S. Application Data

(63) Continuation of application No. PCT/CN2019/120504, filed on Nov. 25, 2019.

(51) Int. Cl.
| | | |
|---|---|---|
| *C09D 5/16* | (2006.01) | |
| *C08G 18/83* | (2006.01) | |
| *C08G 18/28* | (2006.01) | |
| *C08K 3/04* | (2006.01) | |
| *C08K 3/22* | (2006.01) | |
| *C08K 3/34* | (2006.01) | |
| *C09D 4/06* | (2006.01) | |
| *C08K 3/14* | (2006.01) | |
| *C08L 33/08* | (2006.01) | |
| *C08L 75/04* | (2006.01) | |

(52) U.S. Cl.
CPC ......... *C09D 5/1693* (2013.01); *C08G 18/289* (2013.01); *C08G 18/837* (2013.01); *C08K 3/04* (2013.01); *C08K 3/14* (2013.01); *C08K 3/22* (2013.01); *C08K 3/34* (2013.01); *C09D 4/06* (2013.01); *C09D 5/1637* (2013.01); *C09D 5/1687* (2013.01); *C08K 2003/2227* (2013.01); *C08K 2201/005* (2013.01); *C08L 33/08* (2013.01); *C08L 75/04* (2013.01)

(58) Field of Classification Search
None
See application file for complete search history.

(56) References Cited

U.S. PATENT DOCUMENTS

| 2016/0289980 A1* | 10/2016 | Tian | ........................ B05D 1/28 |
| 2018/0304585 A1* | 10/2018 | Sugiyama | .............. C08J 7/0423 |

FOREIGN PATENT DOCUMENTS

| CN | 102190938 A | 9/2011 |

* cited by examiner

*Primary Examiner* — Christopher M Rodd
(74) *Attorney, Agent, or Firm* — Rumit Ranjit Kanakia

(57) ABSTRACT

A super-wear-resistant self-cleaning coating, comprising first elastic finish coat and second self-cleaning finish coat. The first elastic finish coat comprises, by mass, 10-60 parts of a two-functionality-degree polyurethane acrylic resin A, 2-7 parts of an initiator A, 10-60 parts of an acrylate monomer A, and 3-40 parts of an additive A. The second self-cleaning finish coat comprises, by mass, 2-30 parts of an acrylic acid-modified organic silicon resin with inorganic powder affinity, 0.3-3 parts of high-hardness micro-powder particles, 2-20 parts of a two-functionality-degree polyurethane acrylic resin B, 10-40 parts of a multi-functionality-degree polyurethane acrylic resin B, 15-45 parts of an acrylate monomer B, 2-7 parts of an initiator B, and 3-40 parts of an additive B. Further disclosed is a preparation method for the super-wear-resistant self-cleaning coating.

9 Claims, No Drawings

SUPER-WEAR-RESISTANT SELF-CLEANING COATING AND PREPARATION METHOD THEREFOR

CROSS-REFERENCE TO RELATED APPLICATION

The present application is a continuation of International Application No. PCT/CN2019/120504, filed on Nov. 25, 2019, the entire content of which is incorporated herein by reference.

TECHNICAL FIELD

The invention relates to the technical field of building decoration materials, in particular to a super wear-resistant self-cleaning coating and a method for preparing the same.

BACKGROUND

Flooring materials (including plastic flooring, bamboo and wood flooring, composite flooring, etc.) during use are subject to repeated scratches caused by external forces to cause surface damage, such as reduced aesthetics, reduced moisture and water resistance, reduced dirt resistance, and becoming not easy to clean, resulting in great waste of material resources and human resources. Therefore, it is of great significance to develop a coating with super wear resistance and long-lasting self-cleanability. To increase wear resistance, currently available coatings on the market mostly introduce high-hardness inorganic materials (silica powder, ceramic powder, alumina, etc.) to organic coatings to achieve wear resistance and surface scratch resistance by using the high hardness of inorganic materials. The inorganic material and the organic coatings cannot bond together tightly because there is just a simple physical mixing of them. In addition, the common inorganic materials used in the coatings have limited hardness (Mohs hardness of less than 9), resulting in limited wear resistance, scratch resistance and durability of the coating. The coatings on the market are often endowed with dirt resistance by incorporating low surface energy substances (silicone resin, fluorocarbon resin, etc.). The low surface energy substance migrates to the surface of the coating to form a hydrophobic layer with low surface tension, so that contaminants are not easy to wet the coating surface, thereby achieving the purpose of easy cleaning. However, this coating does not have durable dirt resistance, because the content of low surface energy substances gradually decreases after repeated washing until the stain resistance is completely lost.

SUMMARY

The technical problem to be solved by the present invention is to overcome the shortcomings of the prior art, to provide a super wear-resistant self-cleaning coating and a method for preparing the same. The coating composed of a first elastic topcoat and a second self-cleaning topcoat has super wear resistance, scratch resistance, and surface wear resistance, as well as long-lasting self-cleanability, can be widely used in the coating decoration of public places and home furnishing materials and the coating decoration of other places having special requirements for wear resistance and durability.

In order to solve the above technical problem, the technical solution proposed by the present invention is: a super wear-resistant self-cleaning coating, including a first elastic topcoat and a second self-cleaning topcoat, wherein the first elastic topcoat comprises, on the basis of parts by mass, 10-60 parts of a bifunctional polyurethane acrylic resin A, 2-7 parts of an initiator A, 10-60 parts of an acrylate monomer A, and 3-40 parts of an additive A; the second self-cleaning topcoat comprises, on the basis of parts by mass, 2-30 parts of an acrylic modified silicone resin having affinity for an inorganic powder, 0.3-3 parts of a high-hardness micropowder particle, 2-20 parts of a bifunctional polyurethane acrylic resin B, 10-40 parts of a multifunctional polyurethane acrylic resin, 15-45 parts of an acrylate monomer B, 2-7 parts of an initiator B and 3-40 parts of an additive B.

Further, the bifunctional polyurethane acrylic resin A has a soft segment structural unit having a glass transition temperature of −50° C. to 10° C. and a content of 40-80%, the bifunctional polyurethane acrylic resin A is prepared by polymerizing a diol having a molecular weight of 2000-6000 with an isocyanate and a monohydroxy acrylate monomer, the diol is one or more of polycaprolactone diols, polyester diols, dimer acid modified diols, and polytetrahydrofuran diols; the isocyanate is one or more of toluene diisocyanate, isophorone diisocyanate, and 4,4'-bicyclohexylmethane diisocyanate; the monohydroxy acrylate monomer is one or more of hydroxyethyl acrylate, hydroxyethyl methacrylate, and hydroxypropyl acrylate; and the content of the bifunctional polyurethane acrylic resin A is 15-40 parts.

Further, the acrylate monomer A is a mixture of a trifunctional monomer and a bifunctional or monofunctional monomer, wherein the mass fraction of the trifunctional acrylic monomer is 1-20%, and preferably 5-10%; the mass fraction of the bifunctional or monofunctional monomer is 10-50%, and preferably 15-40%, the trifunctional acrylic monomer is one or more of trimethylolpropane triacrylate and ethoxylated trimethylolpropane triacrylate; the bifunctional or monofunctional monomer is one or more of hydroxyethyl methacrylate, hydroxypropyl methacrylate, acryloyl morpholine, 1,6-hexanediol diacrylate, neopentyl glycol diacrylate, dipropylene glycol diacrylate, tripropylene glycol diacrylate, and polyethylene glycol diacrylate.

Further, the acrylic modified silicone resin having affinity for an inorganic powder is prepared by a method comprising the following steps:
 i) selecting hydroxypolysiloxane to react with an isocyanate to obtain a silicone prepolymer;
 ii) reacting the silicone prepolymer with a monohydroxy acrylate monomer to prepare an acrylic modified silicone oligomer;
 iii) reacting the acrylic modified silicone oligomer with a silane coupling agent to prepare an acrylic modified silicone resin having affinity for an inorganic powder;
 the content of the acrylic modified silicone resin having affinity for an inorganic powder is 8-14 parts.

Further, the high-hardness micropowder particle is a powder with a Moh's hardness of not less than 9, and the high-hardness micropowder particle is one or more of diamond micropowder, silicon carbide micropowder, and alumina particles; a particle size of the high-hardness micropowder particle is 1-100 μm, and preferably 5-20 μm.

Further, the bifunctional polyurethane acrylic resin B has a soft segment structural unit having a glass transition temperature of −50° C. to 10° C. and a content of 40-80%, the bifunctional polyurethane acrylic resin B is prepared by polymerizing a diol having a molecular weight of 2000-6000 with an isocyanate and a monohydroxy acrylate monomer, the diol is one or more of polycaprolactone diols, polyester diols, dimer acid modified diols, and polytetrahydrofuran diols; the isocyanate is one or more of toluene diisocyanate, isophorone diisocyanate, and 4,4'-bicyclohexylmethane diisocyanate; the monohydroxy acrylate monomer is one or more of hydroxyethyl acrylate, hydroxyethyl methacrylate, and hydroxypropyl acrylate; and the content of the bifunctional polyurethane acrylic resin B is 5-10 parts.

Further, the glass transition temperature of the multifunctional polyurethane acrylic resin is 50-150° C., and the multifunctional polyurethane acrylic resin is prepared by an end-capping reaction between a polyisocyanate and a hydroxyl-containing acrylate monomer; the polyisocyanate is one or more of isophorone diisocyanate, 4,4'-dicyclohexylmethane diisocyanate, HDI dimer, HDI trimer, HDI biuret and IPDI trimer; the hydroxyl-containing acrylate monomer is one or more of hydroxyethyl acrylate, hydroxyethyl methacrylate, hydroxypropyl acrylate, pentaerythritol triacrylate, and dipentaerythritol pentaacrylate; and the content of the multifunctional polyurethane acrylic resin is 15-30 parts.

Further, the glass transition temperature of the homopolymer of the acrylate monomer B is 50-150° C., and preferably 80-150° C., the acrylate monomer B is a mixture of a multifunctional acrylate monomer and a bifunctional or monofunctional monomer, the mass fraction of the multifunctional acrylate monomer is 5-15%, and the mass fraction of the bifunctional or monofunctional monomer is 10-30%; the multifunctional acrylate monomer is one or more of pentaerythritol triacrylate, pentaerythritol tetraacrylate, trimethylolpropane tetraacrylate, and dipentaerythritol hexaacrylate; the bifunctional or monofunctional monomer is one or more of dipropylene glycol diacrylate, neopentyl glycol diacrylate, and acryloyl morpholine.

Further, both the initiator A and the initiator B are photoinitiators; the additive A and the additive B both comprise a dispersant, a defoamer, a leveling agent, a pigment, a matting powder, a flame retardant and a stabilizer, wherein the matting powder is an inorganic or organic matting powder.

A method for preparing a super wear-resistant self-cleaning coating, comprising the following steps:

1) preparation of a first elastic topcoat: dispersing at high speed or grinding a bifunctional polyurethane acrylic resin, an initiator A, an acrylate monomer A and an additive A in suitable equipment to the required fineness, and then applying the resultant mixture onto a substrate to obtain the first elastic topcoat coating by radiation curing using one or more of UV, LED, and EB;

2) preparation of a second self-cleaning topcoat: grinding an acrylic modified silicone resin having affinity for an inorganic powder and a high-hardness micropowder particle to obtain a high-hardness particle well-wrapped by silicone; dispersing at high speed or grinding the high-hardness particle well-wrapped by silicone together with a bifunctional polyurethane acrylic resin B, a multifunctional polyurethane acrylic resin, an acrylate monomer B, an initiator B and an additive B in suitable equipment to the required fineness, and then applying the resultant mixture onto the first elastic topcoat coating to obtain a super wear-resistant self-cleaning coating by radiation curing using one or more of UV, LED, and EB.

Compared with the prior art, the advantages of the present invention are as follows:

1. The first topcoat of the present invention uses an elastic system, with the bifunctional polyurethane acrylic resin A having a low glass transition temperature and a high flexibility as the first coating film structure; when the coating surface is scratched, the coating film will be displaced in the microscopic morphology, so as to buffer the applied force, and significantly improve the wear resistance and scratch resistance of the coating surface;

2. The second topcoat coating of the present invention is designed with a special formula, where a multifunctional polyurethane acrylic resin and acrylate monomer B having a high glass transition temperature and a high hardness are combined with a small amount of a bifunctional urethane acrylic resin B having a low glass transition temperature and a high flexibility to form a block polymer structure with a hard segment as the main component and a soft segment as the secondary component in the molecular morphology. While achieving high cross-linking and high hardness, the second topcoat coating has improved wear resistance and scratch resistance because the bifunctional polyurethane acrylic resin B having a low glass transition temperature and a high flexibility provides cushioning effect when the coating is subjected to external stress.

3. In the present invention, after the acrylic-modified silicone resin is modified with a silane coupling agent, the pigmentophilic siloxane group can interact with the hydrogen-containing active group in the inorganic powder to form a stable chemical bond, which, together with other raw materials, provides a high-crosslinking and high-hardness coating having a long-lasting coating surface with a low surface energy, thereby significantly reducing the external friction and damage in the microscopic morphology;

4. In the present invention, the acrylic modified organic silicon resin having affinity for an inorganic powder, together with the inorganic powder (especially matting powder) reduces the surface tension of the powder through wrapping effect, forming a layer of hydrophobic dirt-resistant layer to make the product have anti-fouling and self-cleaning properties;

5. In the present invention, a silicone resin having both radiation curing activity and inorganic powder affinity is used to wrap the high-hardness micropowder particles. The high-hardness micropowder particles provide super wear resistance. The silicone resin on the one hand is cross-linked with the organic coating to provide long-lasting self-cleanability, and on the one hand, it wraps the high-hardness micropowder particles, so that the inorganic high-hardness micropowder particles are firmly bonded to the organic coating, providing long-lasting wear resistance and scratch resistance;

6. The super wear-resistant self-cleaning coating prepared by the present invention can be widely used in the coating of flooring in public places, home furnishing flooring and the coating of other places that have special requirements for wear resistance and durability (such as mobile phones, faucets, tables, chairs, flooring, etc.).

DETAILED DESCRIPTION OF THE EMBODIMENTS

In order to facilitate understanding of the present invention, the present invention will be described more fully and meticulously in combination with preferred examples below, but the scope of protection of the present invention is not limited to the following specific examples.

Example 1

A super wear-resistant self-cleaning coating, including a first elastic topcoat and a second self-cleaning topcoat, wherein the first elastic topcoat comprises, on the basis of parts by mass, 20 parts of a bifunctional polyurethane acrylic resin A having a glass transition temperature of −50° C. to 10° C., 5 parts of an initiator A, 50 parts of an acrylate monomer A, and 25 parts of an additive A; the second self-cleaning topcoat comprises, on the basis of parts by mass, 4 parts of an acrylic modified silicone resin having affinity for an inorganic powder, 1 part of a high-hardness micropowder particle, 4 parts of a bifunctional polyurethane acrylic resin B having a glass transition temperature of −50° C. to −10° C., 30 parts of a multifunctional polyurethane acrylic resin having a glass transition temperature of 50-150° C., 35 parts of an acrylate monomer B having a glass transition temperature of 50-150° C., 4 parts of an initiator B and 22 parts of an additive B.

In this example, the bifunctional polyurethane acrylic resin A is prepared by polymerizing a diol with a molecular weight of 2000-6000, an isocyanate and a monohydroxy acrylate monomer. The diol is polycaprolactone diol; the isocyanate is toluene diisocyanate; and the monohydroxy acrylate monomer is hydroxyethyl acrylate.

In this example, the initiator A is 1-hydroxycyclohexyl phenyl ketone (184). The acrylate monomer A is a mixture of 7 parts of ethoxylated trimethylolpropane triacrylate, 10 parts of hydroxyethyl methacrylate, and 33 parts of tripropylene glycol diacrylate.

In this example, the additive A is a mixture of 4 parts of a dispersant, 15 parts of a silica matting powder, 0.5 parts of a defoamer, 0.5 parts of a wetting agent, and 5 parts of a silicon micropowder.

In this example, the acrylate monomer A is a mixture of a trifunctional monomer with a bifunctional or monofunctional monomer, wherein the content of the trifunctional acrylic monomers is 3%; the content of the bifunctional or monofunctional monomer is 20%, the trifunctional acrylic monomer is trimethylolpropane triacrylate; and the bifunctional or monofunctional monomer is hydroxyethyl methacrylate.

In this example, the preparation method of the acrylic modified silicone resin having affinity for an inorganic powder includes the following steps:

i) selecting hydroxypolysiloxane to react with an isocyanate to obtain a silicone prepolymer;

ii) reacting the silicone prepolymer with a monohydroxy acrylate monomer to prepare an acrylic modified silicone oligomer;

iii) reacting the acrylic modified silicone oligomer with a silane coupling agent to prepare an acrylic modified silicone resin having affinity for an inorganic powder;

In this example, the high-hardness micropowder particle is a diamond micropowder with a particle size of 50 μm.

In this example, the bifunctional polyurethane acrylic resin B is prepared by polymerizing a diol with a molecular weight of 2000-6000, an isocyanate, and a monohydroxy acrylate monomer. The diol is polycaprolactone diol; and the monohydroxy acrylate monomer is hydroxyethyl acrylate.

In this example, the multifunctional urethane acrylic resin is prepared by an end-capping reaction between a polyisocyanate and a hydroxyl-containing acrylate monomer. The polyisocyanate is isophorone diisocyanate; and the hydroxyl-containing acrylate monomer is hydroxyethyl acrylate.

In this example, the acrylate monomer B is a mixture of, on the basis of parts by mass, 6 parts of dipentaerythritol hexaacrylate, 10 parts of acryloyl morpholine, and 19 parts of dipropylene glycol diacrylate.

In this example, the initiator B is a mixture of, on the basis of parts by mass, 3 parts of 1-hydroxycyclohexyl phenyl ketone (184) and 1 part of benzophenone (BP).

In this example, the additive B is a mixture of, on the basis of parts by mass, 4 parts of a dispersant, 14 parts of a silica matting powder, 0.5 parts of a defoamer, 0.5 parts of a wetting agent, and 3 parts of a silicon micropowder.

In this example, both the initiator A and the initiator B are photoinitiators which may be any photoinitiator disclosed in the prior art in this field.

In this example, both the additive A and the additive B include a dispersant, a defoamer, a leveling agent, a pigment, a matting powder, a flame retardant and a stabilizer, wherein the matting powder is an inorganic or organic matting powder, and particularly the matting powder is an inorganic matting powder. The above-mentioned components may be any corresponding components disclosed in the prior art in the field.

A method for preparing a super wear-resistant self-cleaning coating, including the following steps:

1) preparation of a first elastic topcoat: dispersing at high speed a bifunctional polyurethane acrylic resin having a glass transition temperature of −50° C. to 10° C., an initiator A, an acrylate monomer A and an additive A in suitable equipment to the required fineness, and then applying the resultant mixture onto a substrate to obtain the first elastic topcoat coating by radiation curing using UV;

2) preparation of a second self-cleaning topcoat: dispersing an acrylic modified silicone resin having affinity for an inorganic powder and a high-hardness micropowder particle to obtain a high-hardness particle well-wrapped by silicone; dispersing at high speed the high-hardness particle well-wrapped by silicone together with a bifunctional polyurethane acrylic resin B having a glass transition temperature of −50° C. to 10° C., a multifunctional polyurethane acrylic resin having a glass transition temperature of 50-100° C., an acrylate monomer B having a glass transition temperature of 50-150° C., an initiator B and an additive B in suitable equipment to the required fineness, and then applying the resultant mixture onto the first elastic topcoat coating to obtain a super wear-resistant self-cleaning coating by radiation curing using UV.

Example 2

A super wear-resistant self-cleaning coating, including a first elastic topcoat and a second self-cleaning topcoat, wherein the first elastic topcoat comprises, on the basis of parts by mass, 30 parts of a bifunctional polyurethane acrylic resin A having a glass transition temperature of −50° C. to 10° C., 4.5 parts of an initiator A, 30.5 parts of an acrylate monomer A, and 35 parts of an additive A; the second self-cleaning topcoat comprises, on the basis of parts by mass, 8 parts of an acrylic modified silicone resin having affinity for an inorganic powder, 0.3 parts of a high-hardness micropowder particle, 3 parts of a bifunctional polyurethane acrylic resin B having a glass transition temperature of −50° C. to −10° C., 40 parts of a multifunctional polyurethane acrylic resin having a glass transition temperature of 50-150° C., 30.7 parts of an acrylate monomer B having a glass transition temperature of 50-150° C., 3 parts of an initiator B and 15 parts of an additive B.

In this example, the bifunctional polyurethane acrylic resin A is prepared by polymerizing a diol with a molecular weight of 2000-6000, an isocyanate and a monohydroxy acrylate monomer. The diol is a mixture of polyester diol and dimer acid modified diol; the isocyanate is isophorone diisocyanate; and the monohydroxy acrylate monomer is a mixture of hydroxyethyl acrylate, hydroxyethyl methacrylate, and hydroxypropyl acrylate.

In this example, the acrylate monomer A is a mixture of a trifunctional monomer with a bifunctional or monofunctional monomer, wherein the trifunctional acrylic monomer is trimethylolpropane triacrylate with a content of 5%; the content of the bifunctional or monofunctional monomer is 25.5%, and the bifunctional or monofunctional monomer is a mixture of 5 parts of neopentyl glycol diacrylate, 15.5 parts of dipropylene glycol diacrylate, and 5 parts of hydroxyethyl methacrylate.

In this example, the additive A is a mixture of, on the basis of parts by mass, 5 parts of a dispersant, 12 parts of a silica matting powder, 0.5 parts of a defoamer, 0.2 parts of a leveling agent, 0.5 parts of a wetting agent, and 12.3 parts of a flame retardant.

In this example, the preparation method of the acrylic modified silicone resin having affinity for an inorganic powder includes the following steps:

i) selecting hydroxypolysiloxane to react with an isocyanate to obtain a silicone prepolymer;

ii) reacting the silicone prepolymer with a monohydroxy acrylate monomer to prepare an acrylic modified silicone oligomer;

iii) reacting the acrylic modified silicone oligomer with a silane coupling agent to prepare an acrylic modified silicone resin having affinity for an inorganic powder;

In this example, the high-hardness micropowder particle is a diamond micropowder with a particle size of 20 μm.

In this example, the bifunctional polyurethane acrylic resin B is prepared by polymerizing a diol with a molecular weight of 2000-6000, an isocyanate, and a monohydroxy acrylate monomer. The diol is dimer acid modified glycol; the isocyanate is 4,4'-dicyclohexylmethane diisocyanate; and the monohydroxy acrylate monomer is a mixture of hydroxyethyl methacrylate and hydroxypropyl acrylate.

In this example, the multifunctional urethane acrylic resin is prepared by an end-capping reaction between a polyisocyanate and a hydroxyl-containing acrylate monomer. The polyisocyanate is a mixture of 4,4'-dicyclohexylmethane diisocyanate, HDI dimer, HDI trimer and HDI biuret; and the hydroxyl-containing acrylate monomer is hydroxyethyl methacrylate.

In this example, the acrylate monomer B is a mixture of, on the basis of parts by mass, 5 parts of pentaerythritol triacrylate, 5 parts of trimethylolpropane tetraacrylate, 4 parts of neopentyl glycol diacrylate, and 16.7 parts of dipropylene glycol diacrylate.

In this example, the initiator B is a mixture of, on the basis of parts by mass, 2 parts of 1-hydroxycyclohexyl phenyl ketone (184) and 1 part of (2,4,6-trimethylbenzoyl) diphenylphosphine oxide (TPO).

In this example, the additive B is a mixture of, on the basis of parts by mass, 3 parts of a dispersant, 10.5 parts of a silica matting powder, 0.5 parts of a defoamer, 0.5 parts of a wetting agent, and 0.5 parts of a leveling agent.

A method for preparing a super wear-resistant self-cleaning coating, including the following steps:

1) preparation of a first elastic topcoat: dispersing at high speed a bifunctional polyurethane acrylic resin having a glass transition temperature of −50° C. to 10° C., an initiator A, an acrylate monomer A and an additive A in suitable equipment to the required fineness, and then applying the resultant mixture onto a substrate to obtain the first elastic topcoat coating by radiation curing using LED;

2) preparation of a second self-cleaning topcoat: dispersing an acrylic modified silicone resin having affinity for an inorganic powder and a high-hardness micropowder particle to obtain a high-hardness particle well-wrapped by silicone; dispersing at high speed the high-hardness particle well-wrapped by silicone together with a bifunctional polyurethane acrylic resin B having a glass transition temperature of −50° C. to 10° C., a multifunctional polyurethane acrylic resin having a glass transition temperature of 50-100° C., an acrylate monomer B having a glass transition temperature of 50-150° C., an initiator B and an additive B in suitable equipment to the required fineness, and then applying the resultant mixture onto the first elastic topcoat coating to obtain a super wear-resistant self-cleaning coating by radiation curing using EB.

Example 3

A super wear-resistant self-cleaning coating, including a first elastic topcoat and a second self-cleaning topcoat, wherein the first elastic topcoat comprises, on the basis of parts by mass, 40 parts of a bifunctional polyurethane acrylic resin A having a glass transition temperature of −50° C. to 10° C., 6 parts of an initiator A, 39 parts of an acrylate monomer A, and 15 parts of an additive A; the second self-cleaning topcoat comprises, on the basis of parts by mass, 20 parts of an acrylic modified silicone resin having affinity for an inorganic powder, 2 part of a high-hardness micropowder particle, 10 parts of a bifunctional polyurethane acrylic resin B having a glass transition temperature of −50° C. to −10° C., 30 parts of a multifunctional polyurethane acrylic resin having a glass transition temperature of 50-150° C., 31 parts of an acrylate monomer B having a glass transition temperature of 50-150° C., 2 parts of an initiator B and 5 parts of an additive B.

In this example, the bifunctional polyurethane acrylic resin A is prepared by polymerizing a diol with a molecular weight of 2000-6000, an isocyanate and a monohydroxy acrylate monomer. The diol is polytetrahydrofuran diol; the isocyanate is a mixture of toluene diisocyanate, isophorone diisocyanate and 4,4'-dicyclohexylmethane diisocyanate; and the monohydroxy acrylate monomer is a mixture of hydroxyethyl acrylate and hydroxypropyl acrylate.

In this example, the initiator A is a mixture of, on the basis of parts by mass, 3 parts of (2,4,6-trimethylbenzoyl) diphenylphosphine oxide (TPO) and 3 parts of 1-hydroxycyclohexyl phenyl ketone (184).

In this example, the acrylate monomer A is a mixture of, on the basis of parts by mass, 5 parts of trimethylolpropane triacrylate and 34 parts of acryloyl morpholine.

In this example, the additive A is a mixture of, on the basis of parts by mass, 2.7 parts of a dispersant, 12 parts of a polyurea matting powder, and 0.3 parts of a defoamer.

In this example, the acrylate monomer A is a mixture of a trifunctional monomer with a bifunctional or monofunctional monomer, wherein the content of the trifunctional acrylic monomers is 15%; the content of the bifunctional or monofunctional monomer is 30%, the trifunctional acrylic monomer is ethoxylated trimethylolpropane triacrylate; and the bifunctional or monofunctional monomer is a mixture of 1,6-hexanediol diacrylate and neopentyl glycol diacrylate.

In this example, the preparation method of the acrylic modified silicone resin having affinity for an inorganic powder includes the following steps:

i) selecting hydroxypolysiloxane to react with an isocyanate to obtain a silicone prepolymer;

ii) reacting the silicone prepolymer with a monohydroxy acrylate monomer to prepare an acrylic modified silicone oligomer;

iii) reacting the acrylic modified silicone oligomer with a silane coupling agent to prepare an acrylic modified silicone resin having affinity for an inorganic powder;

In this example, the high-hardness micropowder particle is a mixture of, on the basis of parts by mass, 1 part of diamond micropowder with a particle size of 10 μm and 1 part of a silicon carbide micropowder with a particle size of 60 μm.

In this example, the bifunctional polyurethane acrylic resin B is prepared by polymerizing a diol with a molecular weight of 2000-6000, an isocyanate, and a monohydroxy acrylate monomer. The diol is a mixture of polyester diol and dimer acid modified diol; the isocyanate is 4,4'-dicyclohexylmethane diisocyanate; and the monohydroxy acrylate monomer is a mixture of hydroxyethyl methacrylate and hydroxypropyl acrylate.

In this example, the multifunctional urethane acrylic resin is prepared by an end-capping reaction between a polyisocyanate and a hydroxyl-containing acrylate monomer. The polyisocyanate is IPDI trimer; and the hydroxyl-containing acrylate monomer is a mixture of pentaerythritol triacrylate and dipentaerythritol pentaacrylate.

In this example, the acrylate monomer B is a mixture of, on the basis of parts by mass, 10 parts of pentaerythritol triacrylate and 21 parts of acryloyl morpholine.

In this example, the initiator B is phenylbis(2,4,6-trimethylbenzoyl) phosphine oxide (819).

In this example, the additive B is a mixture of, on the basis of parts by mass, 4.5 parts of a silicon micropowder, 0.2 parts of a defoamer, and 0.3 parts of a leveling agent.

A method for preparing a super wear-resistant self-cleaning coating, including the following steps:

1) preparation of a first elastic topcoat: dispersing at high speed a bifunctional polyurethane acrylic resin having a glass transition temperature of −50° C. to 10° C., an initiator A, an acrylate monomer A and an additive A in suitable equipment to the required fineness, and then applying the resultant mixture onto a substrate to obtain the first elastic topcoat coating by radiation curing using a combination of UV and LED;

2) preparation of a second self-cleaning topcoat: dispersing an acrylic modified silicone resin having affinity for an inorganic powder and a high-hardness micropowder particle to obtain a high-hardness particle well-wrapped by silicone; dispersing at high speed the high-hardness particle well-wrapped by silicone together with a bifunctional polyurethane acrylic resin B having a glass transition temperature of −50° C. to 10° C., a multifunctional polyurethane acrylic resin having a glass transition temperature of 50-100° C., an acrylate monomer B having a glass transition temperature of 50-150° C., an initiator B and an additive B in suitable equipment to the required fineness, and then applying the resultant mixture onto the first elastic topcoat coating to obtain a super wear-resistant self-cleaning coating by radiation curing using a combination of LED and EB.

Example 4

A super wear-resistant self-cleaning coating, including a first elastic topcoat and a second self-cleaning topcoat, wherein the first elastic topcoat comprises, on the basis of parts by mass, 60 parts of a bifunctional polyurethane acrylic resin A having a glass transition temperature of −50° C. to 10° C., 2 parts of an initiator A, 28 parts of an acrylate monomer A, and 10 parts of an additive A; the second self-cleaning topcoat comprises, on the basis of parts by mass, 15 parts of an acrylic modified silicone resin having affinity for an inorganic powder, 3 part of a high-hardness micropowder particle, 13 parts of a bifunctional polyurethane acrylic resin B having a glass transition temperature of −30° C. to −10° C., 20 parts of a multifunctional polyurethane acrylic resin having a glass transition temperature of 50-150° C., 17 parts of an acrylate monomer B having a glass transition temperature of 50-150° C., 5 parts of an initiator B and 30 parts of an additive B.

In this example, the bifunctional polyurethane acrylic resin A is prepared by polymerizing a diol with a molecular weight of 2000-6000, an isocyanate and a monohydroxy acrylate monomer. The diol is dimer acid modified diol; the isocyanate is a mixture of toluene diisocyanate, isophorone diisocyanate and 4,4'-dicyclohexylmethane diisocyanate; and the monohydroxy acrylate monomer is hydroxyethyl methacrylate.

In this example, the initiator A is phenylbis(2,4,6-trimethylbenzoyl) phosphine oxide (819).

In this example, the acrylate monomer A is a mixture of, on the basis of parts by mass, 8 parts of ethoxylated trimethylolpropane triacrylate, 9 parts of 1,6-hexanediol diacrylate, and 11 parts of hydroxypropyl methacrylate.

In this example, the additive A is a mixture of, on the basis of parts by mass, 2 parts of a dispersant, 7.5 parts of a silica matting powder, and 0.5 parts of a defoamer.

In this example, the preparation method of the acrylic modified silicone resin having affinity for an inorganic powder includes the following steps:

i) selecting hydroxypolysiloxane to react with an isocyanate to obtain a silicone prepolymer;

ii) reacting the silicone prepolymer with a monohydroxy acrylate monomer to prepare an acrylic modified silicone oligomer;

iii) reacting the acrylic modified silicone oligomer with a silane coupling agent to prepare an acrylic modified silicone resin having affinity for an inorganic powder;

In this example, the high-hardness micropowder particle is a mixture of, on the basis of parts by mass, 1 part of diamond micropowder with a particle size of 10 μm, 1 part of a silicon carbide micropowder with a particle size of 30 μm, and 1 part of alumina with a particle size of 30 μm.

In this example, the bifunctional polyurethane acrylic resin B is prepared by polymerizing a diol with a molecular weight of 2000-6000, an isocyanate, and a monohydroxy acrylate monomer. The diol is polyester diol; the isocyanate is isophorone diisocyanate; and the monohydroxy acrylate monomer is hydroxyethyl methacrylate.

In this example, the multifunctional urethane acrylic resin is prepared by an end-capping reaction between a polyisocyanate and a hydroxyl-containing acrylate monomer. The polyisocyanate is 4,4'-dicyclohexylmethane diisocyanate; and the hydroxyl-containing acrylate monomer is hydroxypropyl acrylate.

In this example, the acrylate monomer B is a mixture of, on the basis of parts by mass, 5 parts of trimethylolpropane tetraacrylate, 5 parts of neopentyl glycol diacrylate, and 7 parts of acryloyl morpholine.

In this example, the initiator B is a mixture of, on the basis of parts by mass, 1 part of phenylbis(2,4,6-trimethylbenzoyl) phosphine oxide (819), 2 parts of 2-hydroxy-2-methyl-1-phenyl-1-acetone (1173), 1 part of 4-chlorobenzophenone, and 1 part of active amine.

In this example, the additive B is a mixture of, on the basis of parts by mass, 5 parts of a dispersant, 15 parts of a silica matting powder, 8.5 parts of a wear-resistant powder, 0.5 parts of a defoamer, 0.5 parts of a wetting agent, and 0.5 parts of a leveling agent.

A method for preparing a super wear-resistant self-cleaning coating, including the following steps:

1) preparation of a first elastic topcoat: dispersing at high speed a bifunctional polyurethane acrylic resin having a glass transition temperature of −50° C. to 10° C., an initiator A, an acrylate monomer A and an additive A in suitable equipment to the required fineness, and then applying the resultant mixture onto a substrate to obtain the first elastic topcoat coating by radiation curing using a combination of UV and EB;

2) preparation of a second self-cleaning topcoat: dispersing an acrylic modified silicone resin having affinity for an inorganic powder and a high-hardness micropowder particle to obtain a high-hardness particle well-wrapped by silicone; dispersing at high speed the high-hardness particle well-wrapped by silicone together with a bifunctional polyurethane acrylic resin B having a glass transition temperature of −50° C. to 10° C., a multifunctional polyurethane acrylic resin having a glass transition temperature of 50-100° C., an acrylate monomer B having a glass transition temperature of 50-150° C., an initiator B and an additive B in suitable equipment to the required fineness, and then applying the resultant mixture onto the first elastic topcoat coating to obtain a super wear-resistant self-cleaning coating by radiation curing using a combination of UV and EB.

What is claimed is:

1. A super wear-resistant self-cleaning coating, comprising a first elastic topcoat and a second self-cleaning topcoat, wherein the first elastic topcoat comprises, on the basis of parts by mass, 10-60 parts of a bifunctional polyurethane acrylic resin A, 2-7 parts of an initiator A, 10-60 parts of an acrylate monomer A, and 3-40 parts of an additive A; the second self-cleaning topcoat comprises, on the basis of parts by mass, 2-30 parts of an acrylic modified silicone resin having affinity for an inorganic powder, 0.3-3 parts of a high-hardness micropowder particle, 2-20 parts of a bifunctional polyurethane acrylic resin B, 10-40 parts of a multifunctional polyurethane acrylic resin, 15-45 parts of an acrylate monomer B, 2-7 parts of an initiator B and 3-40 parts of an additive B, wherein the bifunctional polyurethane acrylic resin A has a soft segment structural unit having a glass transition temperature of −50° C. to 10° C. and a content of 40-80%, the bifunctional polyurethane acrylic resin A is prepared by polymerizing a diol having a molecular weight of 2000-6000 with an isocyanate and a monohydroxy acrylate monomer;

the acrylate monomer A is a mixture of a trifunctional monomer and a bifunctional or monofunctional monomer;

wherein the acrylic modified silicone resin having affinity for an inorganic powder is prepared by a method comprising the following steps:
  i) selecting hydroxypolysiloxane to react with an isocyanate to obtain a silicone prepolymer;
  ii) reacting the silicone prepolymer with a monohydroxy acrylate monomer to prepare an acrylic modified silicone oligomer;
  iii) reacting the acrylic modified silicone oligomer with a silane coupling agent to prepare an acrylic modified silicone resin having affinity for an inorganic powder;

the high-hardness micropowder particle is a powder with a Moh's hardness of not less than 9, the bifunctional polyurethane acrylic resin B has a soft segment structural unit having a glass transition temperature of −50° C. to 10° C. and a content of 40-80%, the bifunctional polyurethane acrylic resin B is prepared by polymerizing a diol having a molecular weight of 2000-6000 with an isocyanate and a monohydroxy acrylate monomer;

the glass transition temperature of the multifunctional polyurethane acrylic resin is 50-150° C., and the multifunctional polyurethane acrylic resin is prepared by an end-capping reaction between a polyisocyanate and a hydroxyl-containing acrylate monomer; and the acrylate monomer B is a mixture of a multifunctional acrylate monomer and a bifunctional or monofunctional monomer.

2. The super wear-resistant self-cleaning coating according to claim 1, wherein the content of the bifunctional polyurethane acrylic resin A is 15-40 parts, the content of the bifunctional polyurethane acrylic resin B is 5-10 parts, the diol is one or more selected from a group consisting of polycaprolactone diols, polyester diols, dimer acid modified diols, and polytetrahydrofuran diols; the isocyanate is one or more selected from a group consisting of toluene diisocyanate, isophorone diisocyanate, and 4,4'-bicyclohexylmethane diisocyanate; the monohydroxy acrylate monomer is one or more selected from a group consisting of hydroxyethyl acrylate, hydroxyethyl methacrylate, and hydroxypropyl acrylate.

3. The super wear-resistant self-cleaning coating according to claim 1, wherein for the acrylate monomer A, the trifunctional acrylic monomer is one or more selected from a group consisting of trimethylolpropane triacrylate and ethoxylated trimethylolpropane triacrylate; the bifunctional or monofunctional monomer is one or more selected from a group consisting of hydroxyethyl methacrylate, hydroxypropyl methacrylate, acryloyl morpholine, 1,6-hexanediol diacrylate, neopentyl glycol diacrylate, dipropylene glycol diacrylate, tripropylene glycol diacrylate, and polyethylene glycol diacrylate.

4. The super wear-resistant self-cleaning coating according to claim 1, wherein the content of the acrylic modified silicone resin having affinity for an inorganic powder is 8-14 parts.

5. The super wear-resistant self-cleaning coating according to claim 3, wherein the high-hardness micropowder particle is one or more selected from a group consisting of diamond micropowder, silicon carbide micropowder, and alumina particles; the high-hardness micropowder particle has a particle size of 1-100 μm.

6. The super wear-resistant self-cleaning coating according to claim 5, wherein the high-hardness micropowder particle has a particle size of 5-20 μm.

7. The super wear-resistant self-cleaning coating according to claim 1, wherein for the multifunctional polyurethane acrylic resin: the polyisocyanate is one or more selected from a group consisting of isophorone diisocyanate, 4,4'-dicyclohexylmethane diisocyanate, HDI dimer, HDI trimer, HDI biuret and IPDI trimer; the hydroxyl-containing acrylate monomer is one or more selected from a group consisting of hydroxyethyl acrylate, hydroxyethyl methacrylate, hydroxypropyl acrylate, pentaerythritol triacrylate, and dipentaerythritol pentaacrylate; and the content of the multifunctional polyurethane acrylic resin is 15-30 parts.

8. The super wear-resistant self-cleaning coating according to claim 1, wherein for the acrylate monomer B: the multifunctional acrylate monomer is one or more selected from a group consisting of pentaerythritol triacrylate, pentaerythritol tetraacrylate, trimethylolpropane tetraacrylate, and dipentaerythritol hexaacrylate; the bifunctional or monofunctional monomer is one or more selected from a group consisting of dipropylene glycol diacrylate, neopentyl glycol diacrylate, and acryloyl morpholine.

9. The super wear-resistant self-cleaning coating according to claim 1, wherein both the initiator A and the initiator B are photoinitiators; the additive A and the additive B both comprise a dispersant, a defoamer, a leveling agent, a pigment, a matting powder, a flame retardant and a stabilizer, wherein the matting powder is an inorganic or organic matting powder.

* * * * *